United States Patent
Senatori

(10) Patent No.: US 8,649,174 B2
(45) Date of Patent: Feb. 11, 2014

(54) APPARATUS AND ARTICLE FOR SEPARATING INTAKE AIR FROM EXHAUST AIR

(75) Inventor: Mark Senatori, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 13/386,908

(22) PCT Filed: Mar. 23, 2010

(86) PCT No.: PCT/US2010/028367
§ 371 (c)(1),
(2), (4) Date: Jan. 25, 2012

(87) PCT Pub. No.: WO2011/119150
PCT Pub. Date: Sep. 29, 2011

(65) Prior Publication Data
US 2012/0120593 A1    May 17, 2012

(51) Int. Cl.
*G06F 1/20* (2006.01)
*H05K 7/20* (2006.01)

(52) U.S. Cl.
USPC .............. 361/679.5; 361/679.48; 361/679.49; 361/679.55; 361/695; 454/184; 454/190

(58) Field of Classification Search
USPC .............. 361/679.48–679.5, 679.55–679.56, 361/692, 694–695; 415/203–205, 212.1, 415/224; 454/184, 199–193
See application file for complete search history.

(56) References Cited

U.S. PATENT DOCUMENTS

| | | | | |
|---|---|---|---|---|
| 5,263,897 A * | 11/1993 | Kondo et al. | | 454/189 |
| 6,754,077 B2 * | 6/2004 | Lo et al. | | 361/700 |
| 6,999,312 B1 | 2/2006 | Garnett et al. | | |
| 7,255,532 B2 * | 8/2007 | Zheng | | 415/183 |
| 8,107,239 B2 * | 1/2012 | Fujiwara | | 361/695 |
| 8,534,998 B2 * | 9/2013 | Liang et al. | | 415/182.1 |
| 2004/0004817 A1 | 1/2004 | Greco | | |
| 2005/0252641 A1 | 11/2005 | Chang | | |
| 2006/0021735 A1 * | 2/2006 | Lopatinsky et al. | | 165/80.3 |
| 2007/0041157 A1 | 2/2007 | Wang | | |

OTHER PUBLICATIONS

International Searching Authority, International Search Report and Written Opinion, Appln. No. PCT/US2010/028367, data of mailing Feb. 21, 2011, 10 p.

* cited by examiner

*Primary Examiner* — Robert J Hoffberg

(57) ABSTRACT

An apparatus and article is disclosed for separating intake air from exhaust air. The apparatus discloses an intake port, coupled to conduct intake air; an exhaust port, coupled to conduct exhaust air; and an air-curtain port, coupled to conduct air-curtain air to separate at least a portion of the intake air conducted by the intake port from the exhaust air conducted by the exhaust port. The article discloses a ductwork shell article, having an intake vent, an intake chamber, an exhaust vent, an exhaust chamber, an air-curtain vent, and an air-curtain chamber; wherein: the air-curtain vent is in part located between the exhaust vent and the intake vent.

11 Claims, 3 Drawing Sheets

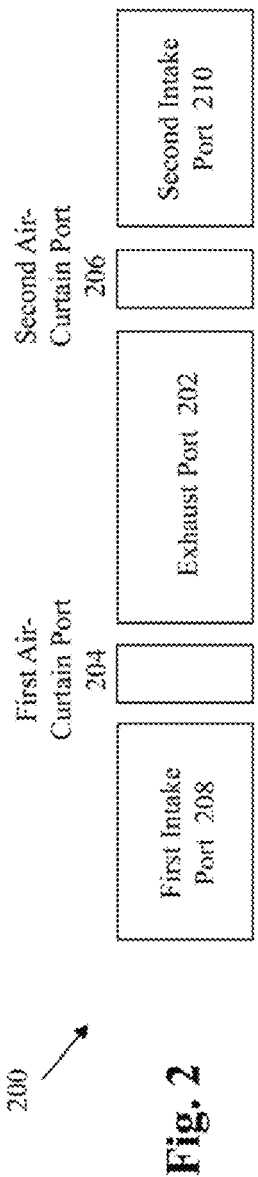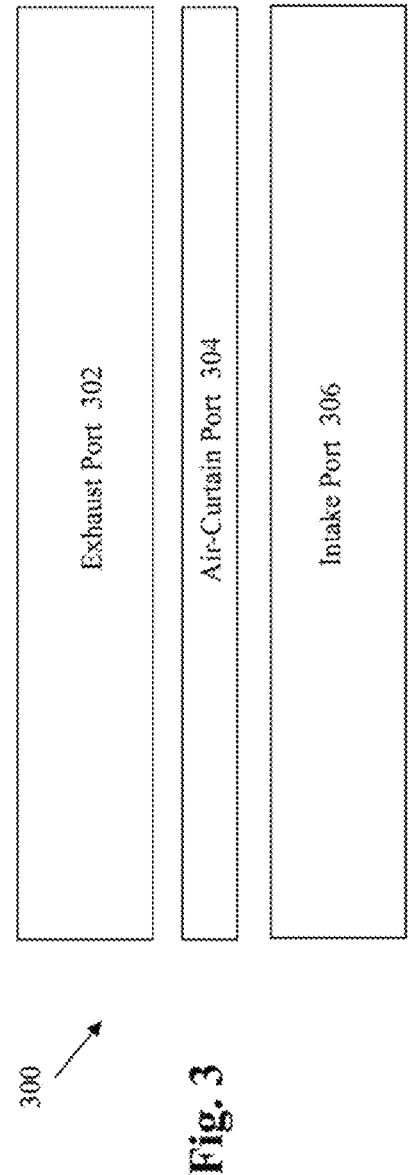

APPARATUS AND ARTICLE FOR SEPARATING INTAKE AIR FROM EXHAUST AIR

BACKGROUND OF THE INVENTION

Field of the Invention

The present invention relates generally to articles and apparatus for thermal control, and more particularly to managing thermal air-flow.

BRIEF DESCRIPTION OF THE DRAWINGS

Some examples of the invention are described in the following figures:

FIG. 2 is one example of a second configuration between an air-curtain, an intake and an exhaust port;

FIG. 3 is one example of a third configuration between an air-curtain, an intake and an exhaust port.

DETAILED DESCRIPTION

Figure 1:
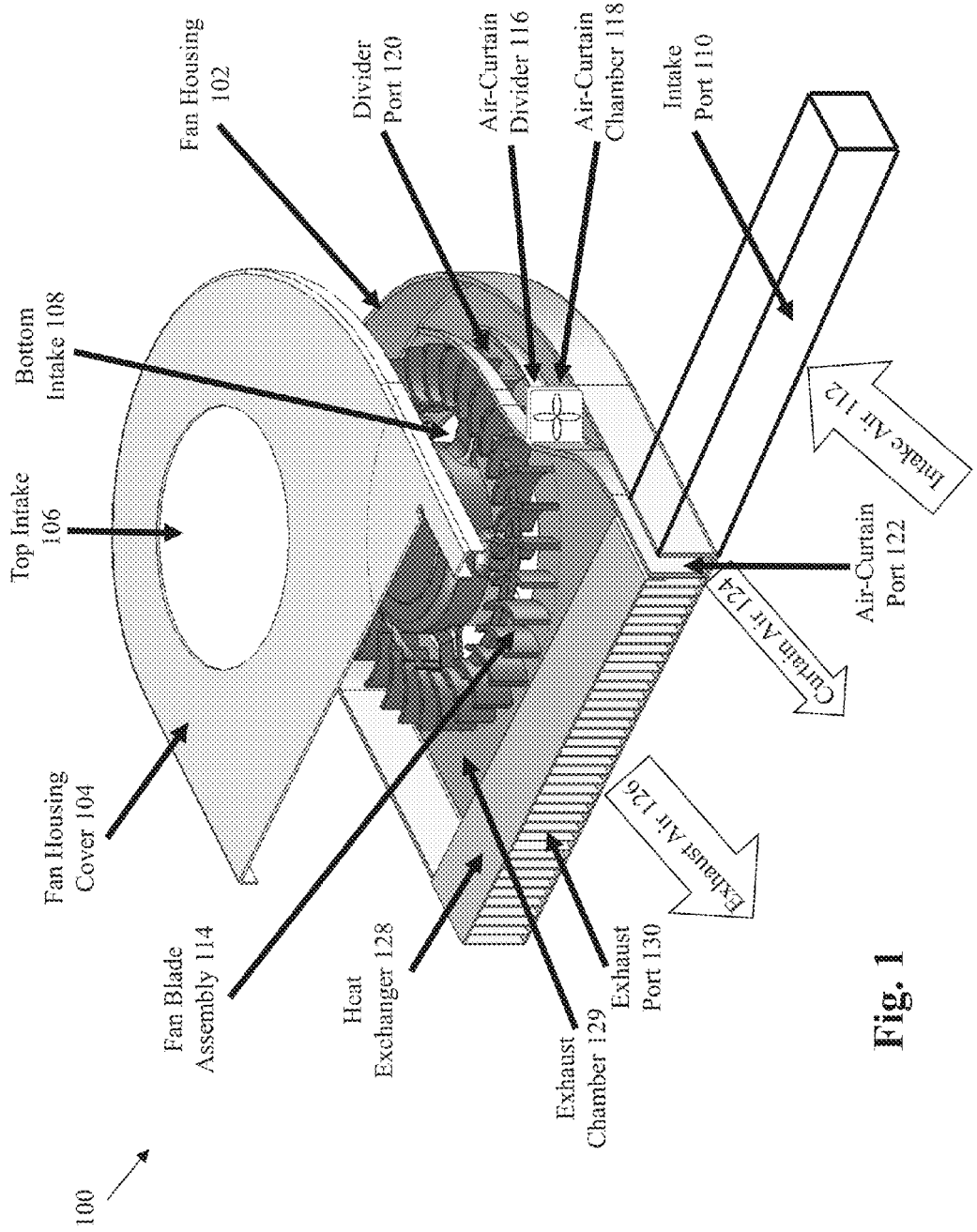
FIG. 1 is one example of an apparatus using a first configuration for separating intake air from exhaust air.

Computers, such as desktop, laptops, notebooks, and netbooks, contain many components packed tightly in a confined space limited by the form-factor of the computer. Cooling such tightly packed components, especially the CPU, often necessitates that space be allotted to a cooling fan of some sort. The cooling fan will have one or more intake ports and exhaust ports so arranged to keep the computer's components within their operational thermal performance limits. For cooling purposes, as large a fan as possible would typically be ideal; however, the form-factor of many computers, such as notebooks encourage use of as small a fan and associated ductwork as possible. Balancing these two competing design constraints is a delicate task, but the smaller the fan, then the more room available for a bigger CPU, more memory, and additional functionality.

If the intake port in such computers is placed at less than a certain distance from the exhaust port, the hot air-flow from the exhaust port begins to be drawn into the intake port and thereby re-circulate the hot air into the computer and thus not cool the computer as efficiently as possible.

For example, perhaps up to one-quarter of the air drawn in from a cooling fan intake located underneath side of a lap top computer will be the hot air exiting from the fan's exhaust from one of the sides of the computer.

Such a problem is even further exasperated when a cooling fan has multiple speeds, whereby cool air normally drawn in at low speeds is later replaced with hot exhaust port air drawn in at high speeds, at the very time the CPU, or some other component, requires greater cooling.

One approach toward addressing this problem is to place the intake port as far away from the exhaust port as possible, to try and minimize the proportion of heated exhaust air which is immediately pulled back into the cool air intake. However, such an increased distance comes at the price of greater air-flow ductwork to and from the cooling fan. Such ductwork consumes valuable computer real-estate, especially in a notebook form-factor, whose small size already puts a premium on space.

Another approach adds a "plastic foot" or some other physical barrier to try and "block" the intake and exhaust air-flows. This approach adds a protruding surface to the computer which can cause usability problems especially on portable computers where the foot/barrier would typically need to be constantly attached and removed from the computer, thereby impairing convenience of operation.

The present invention addresses and remedies many, if not all, of the problems discussed above.

Some of the advantages of the present invention include: allowing the intake port and exhaust port to be placed very closely together, while simultaneously keeping the intake and exhaust air-flow separate. Such closer proximity of the intake and exhaust ports, permits a much smaller cooling fan assembly, thereby freeing up computer real-estate for additional connectors, venting, expansion modules, and/or other computer functionality. In some embodiments of the invention, such as a notebook computer, the intake port need no longer be underneath the computer thus permitting the notebook to be placed completely flat on a compliant surface with no concern about blocking the computer's intake ports. Not having an intake port underneath the computer enables heat from the computer to be better transferred directly to the surface on which the computer rests, thereby providing a second thermal path for heat to be removed from the computer. In other embodiments, the much smaller venting and ductwork area required comports with the drive toward smaller and smaller computer form-factors and footprints.

Details of the present invention are now discussed.

Figure 4:
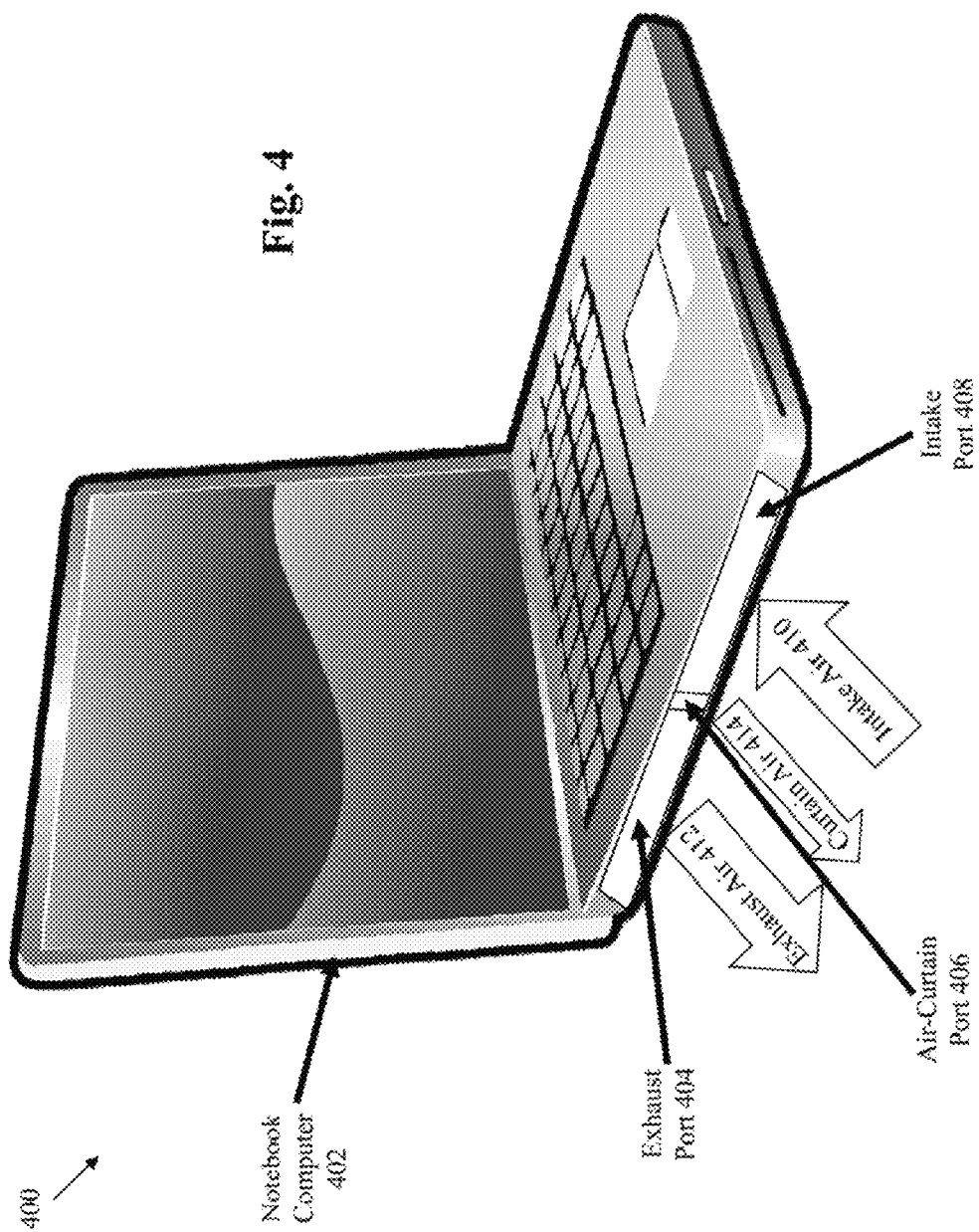
FIG. 4 is one example of a system for separating intake air from exhaust air on a computer.

FIG. 1 is one example of an apparatus 100 using a first configuration for separating intake air from exhaust air. One example of the apparatus 100 in a system is shown in FIG. 4 and will be discussed below. The apparatus 100 includes: a fan housing 102; a fan housing cover 104; a top intake 106, a bottom intake 108, an intake port 110; a fan blade assembly 114; an air-curtain divider 116; an air-curtain chamber 118; a divider port 120; an air-curtain port 122; a heat exchanger 128; and an exhaust port 130.

The fan housing 102 and fan housing cover 104 are disposed so as to create an enclosure. This enclosure in one example is integrated as part of a plastic molded computer shell, such as a notebook or laptop shell. The enclosure includes the top intake 106 and bottom intake 108 openings which are coupled to receive air-flow from the intake port 110 through ductwork forming an intake chamber (not shown). The exact configuration of plastic molded intake chamber ductwork used to conduct the air-flow from the intake port 110 to the top and bottom intakes 106 and 108 can vary with each implementation of the present invention, without undue experimentation.

In other examples of the present invention, the top, and bottom intakes 106 and 108 can be additionally coupled to receive air-flow from vent openings which draw air-flow from inside a system or computer, or from vent openings encircling the system (e.g. surrounding the base of a notebook computer).

The fan blade assembly 114 is instantiated within the enclosure. A fan, in the fan blade assembly 114, when rotating creates a low-pressure region (e.g. partial vacuum) which draws (i.e. urges, conducts, etc) intake air 112 from outside of the apparatus 100 into the intake port 110 and then through the top and bottom intakes 106 and 108.

The intake air 112 is then passed through the fan blade assembly 114. An air-curtain divider 116 divides the intake air 112 into a first portion and a second portion. The first portion is air-curtain air 124 and the second portion is exhaust air 126. The air-curtain divider 116, in one embodiment, is a curved strip having a notch (i.e. divider port 120) at one end, such as a "V" shape, as shown in FIG. 1.

The air-curtain air 124 is, in one embodiment, generated by passing the first portion of the intake air 112 through the divider port 120 on the air-curtain divider 116. This first portion of the intake air 112 then enters the air-curtain chamber 118. The air-curtain chamber 118 has a cross-sectional area which is greater near the divider port 120 and smaller near the air-curtain port 122. This reduction in cross-sectional area increases, the velocity of the first portion of the intake air 112 (i.e. the air-curtain air 124) though a "venturi" effect.

In another embodiment, the air-curtain air 124 is generated by passing the first portion of the intake air 112 through a second fan assembly (e.g. an air-curtain fan—not shown) which uses electrical energy to increase the velocity of the first portion of the intake air 112 (i.e. the air-curtain air 124).

The second portion of the intake air 112 (i.e. the exhaust air 126) is passed through an exhaust chamber 129 to the heat exchanger 128, and then out the exhaust port 130. The heat exchanger 128 is designed to be thermally coupled to one or more heat emitting devices, once the apparatus 100 is included within a system, such as a notebook computer. If the apparatus 100 is included within a notebook computer, the heat emitting devices can include: a CPU, MOSFETs, amplifiers, display drivers, etc., perhaps coupled to the heat exchanger 128 using various heat sinks, epoxies, thermally conductive greases, and so on. As the exhaust air 126 is passed through the heat exchanger 128, the exhaust air 126 is heated as the system transfers heat to this second portion of the intake air 112.

In one embodiment of the present invention, the intake port 110, the air-curtain port 122, and the exhaust port 130 are placed in a row next to each other, as shown in FIG. 1, with the air-curtain port 122 in between (i.e. separating, dividing, etc.) the intake port 110 and the exhaust port 130. Movement of the air-curtain air 124 keeps the relatively cool intake air 112 separated from the relatively hot exhaust air 126. Depending upon what system or computer the apparatus 100 is cooling, the velocity of the air-curtain air 124 exiting the air-curtain port 122 can according be varied from slow to fast. In general, the faster the velocity of the air-curtain air 124, the further distance from the apparatus 100 will any "mixing" between the intake air 112 and the exhaust air 126 occur. If the velocity of the air-curtain air 124 is sufficiently great, then mixing will occur so far away from the apparatus 100 such that the hot exhaust air 126 will have had more time to "cool down" to at or near the ambient conditions in which the apparatus 100 is operating.

Thus, the apparatus 100 prevents thermally heated air exiting the exhaust port 130 from being recirculated into the intake port 110 due to the high-velocity air exiting the air-curtain port 122. This high-velocity air acts as a separation curtain between the lower velocity exhaust and intake air being conducted by the intake port 110 and the exhaust port 130, preventing them from mixing too close to the computer.

The separating effectiveness of the air-curtain air 124 is enhanced, not only by ensuring that the air-curtain air 124 is of a sufficiently high-velocity, but also that the intake air 112 and the exhaust air 126 are of sufficiently low-velocity. Keeping the intake air 112 and the exhaust air 126 velocity low is enabled by increasing the cross-sectional area of the intake port 110 and the exhaust port 130 relative to the top and bottom intakes 106 and 108, in what could be called a reverse venturi-effect.

In the embodiment shown in FIG. 1, the cross-sectional area of the air-curtain port 122 is much smaller than the cross-sectional areas of the intake and exhaust ports 110 and 130. This embodiment enables the velocity of the air-curtain air 124 to be much higher than the velocity of the intake and exhaust air 112 and 126 using only one fan in the fan blade assembly 114. Other embodiments of the present invention, however, are possible using various relative cross-sectional areas for the three ports 110, 122, and 130, so long as the air-curtain air 124 at least to a minimal degree, keeps the intake and exhaust air 112 and 126 separated.

Similarly, the "height" of all three ports 110, 122, and 130 are in this embodiment of the same, or close to the same height. However, in other embodiments, the "height" and the exact cross-sectional shape (e.g. rectangle, circle, etc.) of these ports 110, 122, and 130 can vary as well.

Also, since the density of the relatively cooler air-curtain air 124 is greater than the density of the hotter exhaust air 126, the air-curtain air's 124 blocking/curtaining effects are further enhanced to keep the intake air 112 separated from the exhaust air 126.

In FIGS. 2 and 3, some alternate possible arrangements between the intake port 110, the air-curtain port 122, and the exhaust port 130 are now presented. In the first orientation discussed in FIG. 1, as well as in the now to be presented second and third orientations, the air-curtain air exiting the air-curtain port effectively replace use of a "physical divider" (e.g. "plastic foot" or other air flow blocking device), thus providing a cleaner design which does not require protruding "physical dividers".

FIG. 2 is one example of a second configuration 200 between an air-curtain, an intake and an exhaust port. The second configuration 200 includes: an exhaust port 202, a first air-curtain port 204, a second air-curtain port 206, a first intake port 208, and a second intake port 210. In this second configuration 200, the exhaust port 202 is first bordered on either side by the first and second air-curtain ports 204 and 206. The first and second intake ports 208 and 210 are then positioned on the other side of the first and second air-curtain ports 204 and 206. The first and second air-curtain ports 204 and 206 keep the air exiting the exhaust port 202 from mixing with the air entering the intake ports 208 and 210. Depending upon a particular instantiation of the present invention, the pattern of the ports 202, 204, 206, 208, and 210 in the second configuration 200 can be repeated, with a common element being the "intake and exhaust air separating effects" of the air-curtain ports 204 and 206.

FIG. 3 is one example of a third configuration 300 between an air-curtain, an intake and an exhaust port. The third configuration 300 includes: an exhaust port 302, an air-curtain port 304, and an intake port 306. In this third configuration 300, the ports 302, 304, and 306 are positioned vertically with respect to each other. An underside of the exhaust port 302 is bordered by the air-curtain port 304. The underside of the air-curtain port 304 is then bordered by the intake port 306. As before, the air-curtain port 304 keeps the air exiting the exhaust port 302 from mixing with the air entering the intake port 306. Also, as in FIG. 2, depending upon a particular instantiation of the present invention, the pattern of the ports 302, 304, and 306 in the third configuration 300 can be repeated, with a common element being the "intake and exhaust air separating effects" of the air-curtain port 304.

FIG. 4 is one example of a system 400 for separating intake air from exhaust air on a computer. The system 400 is in the form of a notebook computer 402 having an exhaust port 404, an air-curtain port 406, and intake port 408. The system 400, in this embodiment, is configured with the apparatus 100 in the first orientation, discussed with respect to FIG. 1. As shown, intake air 410 entering the intake port 408 is separated from the exhaust air 412 exiting the exhaust port 404 by the air-curtain air 414 exiting the air-curtain port 406. Positioning the ports 404, 406, and 408 in the first orientation enables these ports to neatly fit within the form factor of the notebook computer 402. Also, while the system 400 shows the exhaust, air-curtain, and intake ports 404, 406, and 408 positioned along the side of the notebook computer 402, these ports can be positioned along the back of (or another place on) the notebook computer 402 as well, depending upon how the notebook computer 402 is designed. Alternatively, the air-curtain port 406 could be placed at a corner of the computer 402 and the intake port 408 placed on one side of the computer 402 (e.g. the left or right side) and the exhaust port 404 placed on another side of the computer 402 (e.g. the back).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. An apparatus for separating intake air from exhaust air, comprising:
    an intake port, coupled to conduct the intake air;
    an exhaust port, coupled to conduct the exhaust air;
    an air-curtain port, coupled to conduct air-curtain air to separate at least a portion of the intake air conducted by the intake port from the exhaust air conducted by the exhaust port;
    an air-curtain divider, having a divider port which divides the intake air into the air-curtain air and the exhaust air; and
    at least one of:
    an enclosure, coupled to the intake port, wherein the air-curtain divider is positioned within the enclosure thereby forming an air-curtain chamber, having a first end coupled to the intake port, and a second end coupled to the air-curtain port, and wherein the first end of the air-curtain chamber has a greater cross-sectional area than the second end of the air-curtain chamber, such that a velocity of the air-curtain air increases when the air-curtain air moves from the first end to the second end of the air-curtain chamber; or
    an air-curtain fan, coupled to increase the velocity of the air-curtain air as the air-curtain air moves from the divider port to the air-curtain port;
    whereby the apparatus reduces a mixing of the exhaust air with the intake air.

2. The apparatus of claim 1:
    wherein the air-curtain air has a higher velocity than one from a group including: the exhaust air and the intake air.

3. The apparatus of claim 1:
    wherein the intake port and exhaust port are positioned on opposite sides of the air-curtain port.

4. The apparatus of claim 1:
    wherein the exhaust air is at a higher temperature than the intake air.

5. The apparatus of claim 1: wherein the divider port forms a substantially "v-shaped" notch, in the air-curtain divider.

6. The apparatus of claim 1:
    further comprising, a fan blade assembly, having a fan, coupled to the intake port, exhaust port, and air-curtain port, which when rotating creates a low-pressure region which urges the intake air into the intake port, and also creates a high-pressure region which urges the exhaust air out of the exhaust port, and the air-curtain air out of the air-curtain port.

7. The apparatus of claim 1:
    further comprising a computer, having a heat source coupled to a heat exchanger;
    wherein the apparatus is coupled to the heat exchanger to remove heat from the computer.

8. An apparatus for separating intake air from exhaust air, comprising:
    an intake port, coupled to receive the intake air at a first velocity;
    an exhaust port, coupled to transmit the exhaust air at a second velocity; and
    an air-curtain port, coupled between the intake port and the exhaust port, to conduct air-curtain air at a third velocity, wherein the third velocity is greater than the second velocity;
    an air-curtain divider, which divides the intake air into the air-curtain air and the exhaust air; and
    wherein the air-curtain divider forms an air-curtain chamber, having a cross-sectional area which decreases toward the air-curtain port so as to conduct the air-curtain air at the third velocity; and wherein the air-curtain divider forms an exhaust chamber, having a cross-sectional area which increases toward the exhaust port so as to transmit the exhaust air at the second velocity;
    whereby the apparatus reduces recirculation of the exhaust air with the intake air.

9. An article of manufacture for instantiating an air-curtain between an intake port and an exhaust port comprising:
    a ductwork, having the intake port, an intake chamber, the exhaust port, an exhaust chamber, an air-curtain port, and an air-curtain chamber;
    wherein:
        a first portion of the ductwork couples the intake port to the intake chamber to conduct intake air;
        a second portion of the ductwork couples the intake chamber to the air-curtain chamber and the exhaust chamber;
        a third portion of the ductwork couples the exhaust chamber to the exhaust port to conduct exhaust air;
        a fourth portion of the ductwork couples the air-curtain chamber to the air-curtain port to conduct air-curtain air; and
        the air-curtain port is in part located between the exhaust port and the intake port;
    wherein the air-curtain chamber has a first end coupled to the intake port, and a second end coupled to the air-curtain port; and
    wherein the first end of the air-curtain chamber has a greater cross-sectional area than the second end of the air-curtain chamber, such that a velocity of the air-curtain air increases when the air-curtain air moves from the first end to the second end of the air-curtain chamber;
    whereby the article of manufacture reduces a heating of the intake air by the exhaust air.

10. The article of claim 9, wherein: the intake port, the air-curtain port, and the exhaust port are placed in one from a group including: a horizontal row and a vertical column.

11. The article of claim 9: further comprising, a computer; wherein the intake port is substantially located at a first side of the computer, the exhaust port is substantially located at a second side of the computer, and the air-curtain port is located between the first side and the second side of the computer.

* * * * *

UNITED STATES PATENT AND TRADEMARK OFFICE
CERTIFICATE OF CORRECTION

Page 1 of 1

PATENT NO. : 8,649,174 B2
APPLICATION NO. : 13/386908
DATED : February 11, 2014
INVENTOR(S) : Mark Senatori It is certified that error appears in the above-identified patent and that said Letters Patent is hereby corrected as shown below:

In the Claims

In column 6, line 35, in Claim 9, delete "ductwork," and insert -- ductwork --, therefor.

Signed and Sealed this
Twenty-seventh Day of May, 2014

Michelle K. Lee
*Deputy Director of the United States Patent and Trademark Office*